(12) United States Patent
Roach et al.

(10) Patent No.: US 10,423,303 B1
(45) Date of Patent: Sep. 24, 2019

(54) PROGRESSIVE INFORMATION PANELS IN A GRAPHICAL USER INTERFACE

(71) Applicant: A9.com, Inc., Palo Alto, CA (US)

(72) Inventors: Benjamin Jackson Roach, Seattle, WA (US); Sean Michael Bell, North Bend, WA (US); Whitney Gale Spathelf, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 300 days.

(21) Appl. No.: 15/280,536

(22) Filed: Sep. 29, 2016

(51) Int. Cl.
*G06F 3/048* (2013.01)
*G06F 3/0482* (2013.01)
*G06F 3/0485* (2013.01)
*G06F 3/0488* (2013.01)
*G06Q 30/06* (2012.01)
*G06F 16/957* (2019.01)
*G06F 3/16* (2006.01)
*G06F 3/01* (2006.01)
*G06F 3/033* (2013.01)
*G06F 3/041* (2006.01)

(52) U.S. Cl.
CPC .......... *G06F 3/0482* (2013.01); *G06F 3/0485* (2013.01); *G06F 3/04883* (2013.01); *G06F 16/9577* (2019.01); *G06Q 30/0625* (2013.01); *G06Q 30/0643* (2013.01); *G06F 3/013* (2013.01); *G06F 3/033* (2013.01); *G06F 3/0414* (2013.01); *G06F 3/167* (2013.01)

(58) Field of Classification Search
CPC ....................................................... G06F 3/048
See application file for complete search history.

(56) References Cited

U.S. PATENT DOCUMENTS

| 7,797,635 | B1 * | 9/2010 | Denise | G06F 17/30864 707/706 |
| 2014/0195890 | A1 * | 7/2014 | Taylor | G06F 17/30 715/234 |
| 2014/0282254 | A1 * | 9/2014 | Feiereisen | G06F 3/04842 715/835 |

* cited by examiner

*Primary Examiner* — Pei Yong Weng
(74) *Attorney, Agent, or Firm* — Hogan Lovells US LLP

(57) ABSTRACT

Approaches are described for an interface element that displays progressively more information about a search result in a listing of search results. In an embodiment, a user interacts with a search result, for example by utilizing a gesture on a touch-sensitive display, and a supplemental content item is generated and displayed using, in one example, a subset of available supplemental information associated with the search result. The display of the supplemental content item is accompanied by an animation is some embodiments whereby the supplemental content item visually "slides" over to replace the search result.

17 Claims, 14 Drawing Sheets

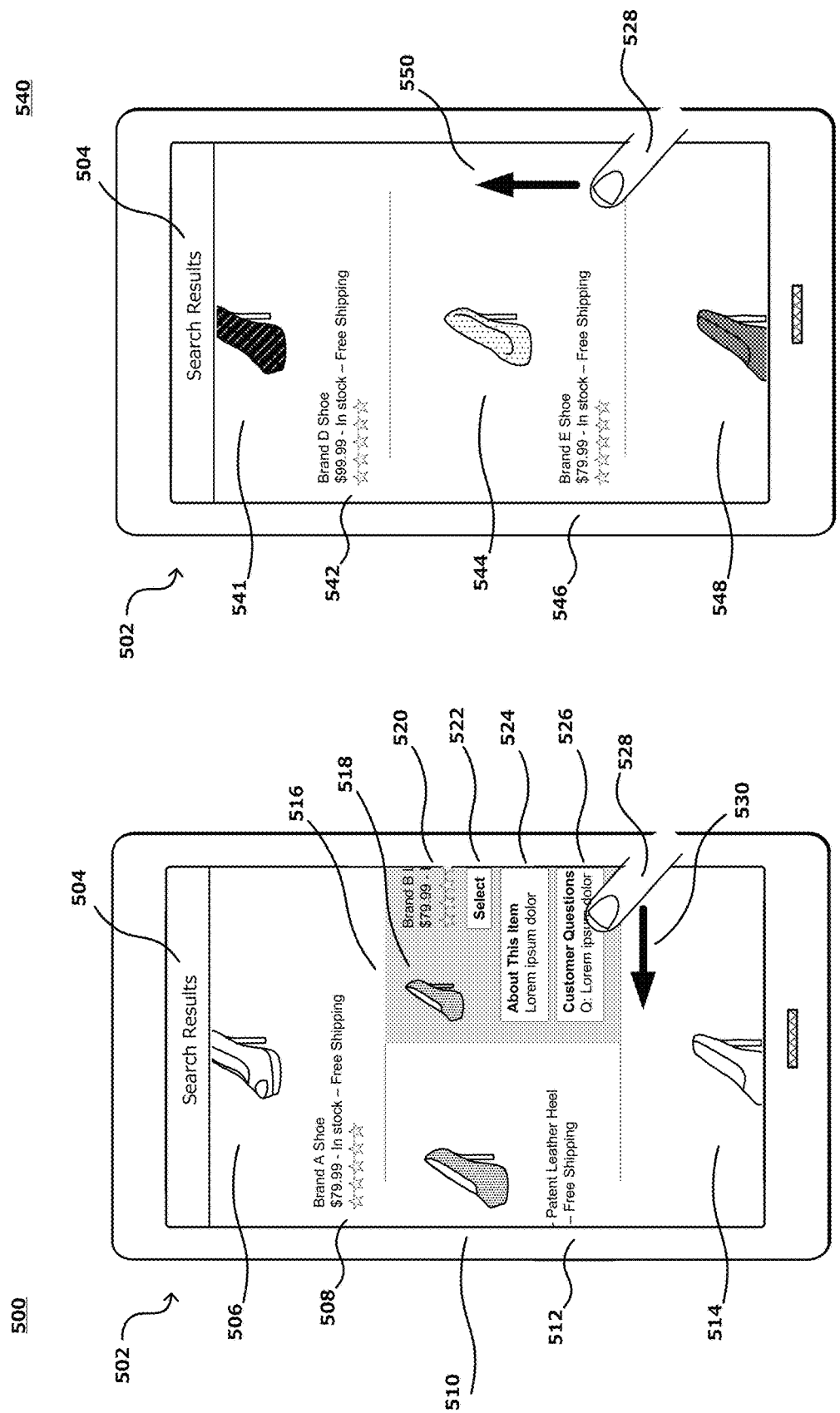

PROGRESSIVE INFORMATION PANELS IN A GRAPHICAL USER INTERFACE

BACKGROUND

Users are increasingly utilizing electronic devices to obtain various types of information. For example, a user wanting to purchase a product, such as a shoe, might access a web site, such as an electronic marketplace, in order to search the types of shoes offered through that marketplace. On some devices, the process of obtaining a particular item from the search results may involve numerous clicks or other interactions with the graphical user interface on the device that may take the user away from the original search results. Such a process can be time consuming and potentially frustrating for a user, which can result in the user losing their place in the original search results and as a result, giving up and leaving the web site.

BRIEF DESCRIPTION OF THE DRAWINGS

Various embodiments in accordance with the present disclosure will be described with reference to the drawings, in which:

FIGS. 5A-5C illustrate an example user interface that can display search results and progressive information panels, in accordance with various embodiments;

DETAILED DESCRIPTION

Figure 1:
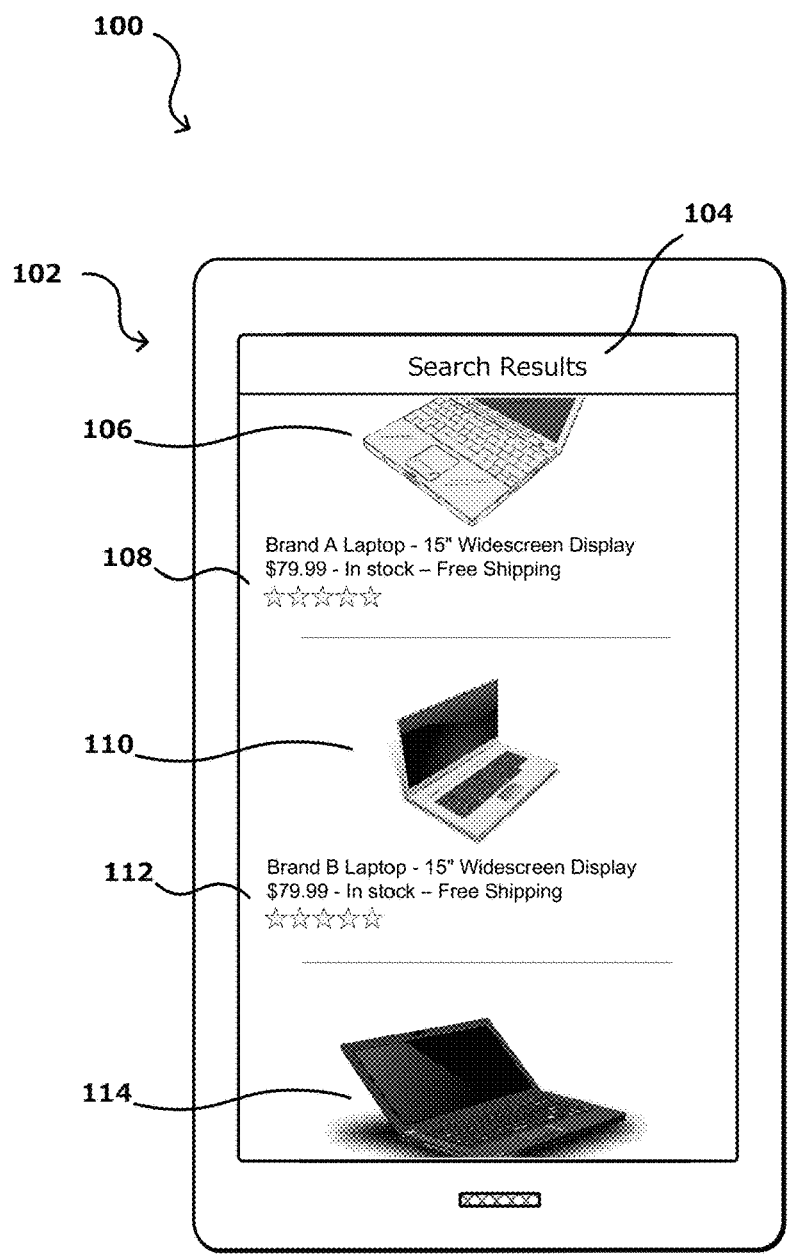
FIG. 1 illustrates an example user interface that can display search results, in accordance with various embodiments.

Systems, devices and methods in accordance with various embodiments of the present disclosure may overcome one or more of the aforementioned and other deficiencies experienced in conventional approaches for managing user interaction with search results. In particular, various embodiments enable the generation and displaying of progressive information panels in a user interface, for example on an electronic device with a touch-sensitive display. Various embodiments may be implemented on displays with separate touch- or gesture-detecting surfaces that are not integrated with a display, as well as on systems that are capable of operating via other or additional input paradigms, such as voice commands or gaze-detection system based on eye-tracking; for example, as may be found in augmented-reality systems that may incorporate separate devices such as headsets or cameras. For example, the present disclosure may refer to "interacting" with a display or a logical region of a display, where such interaction may be interpreted as a physical interaction such as a touch or a virtual interaction, such as using voice or gaze tracking.

According to various embodiments, a search query is executed against a data source or store; for example, a search for a particular type of products is made at an electronic marketplace, such as for "laptop computers" or "casual shoes." The search may comprise alternate and/or additional constraints or characteristics, such as color, size, price, manufacturer, etc. In response to the search query being executed against the data source, a set of search results are received by an electronic device, which in some embodiments may not be the same device that initiated the search. The search results may be ordered; for example, by popularity, price, or some other individual or combination of criteria. The search results may each be associated with a unique identifier; for example, an ASIN, UPC code, serial number, or some other identifier that distinguishes one product from another, for example. In some embodiments, the search query may return a list of these unique identifiers, which are then resolved by querying a product database, for example.

According to various embodiments, the set of search results received by the device may be too numerous to display on a single "page" of the display; for example, in a shopping "app" or a web browser app executing on the device. In this example, a subset of the search results are displayed at any given time, which number may be determined by user preference or system settings, for example. As is known in the art, the search results may be configured to scroll together in any direction; for example, scrolling "down" sends the original subset off the top of the screen and gradually replaces them with a new subset that scrolls onto the screen as individual search results of the original subset scroll off the screen. In some examples, the subset may move as a unit; for example, all three search results in a subset may either all be on the screen, or sent off the screen and replaced by another 3-unit subset of search results, while other embodiments allow the entire set of search results to scroll as a unit as if the search results were part of a continuous list, of which only a subset of the search results can fit on the screen at any one time by scrolling the list in one of predetermined directions.

The search results returned may comprise images, text, and/or a combination of both, which in some embodiments the content returned as representing each search result may be considered a "supplemental content item" or "supplemental content element." In some embodiments, the search results may comprise playable elements such as an audio-visual selection. According to various embodiments, the unique identifier associated with each of the search results may be used to access a set of information (e.g., an essential data set) related to a particular item that is identified by the unique identifier, such as a product in an electronic marketplace. The supplemental content item or supplemental content element may comprise some or all of this set of information about each search result; for example, the supplemental content item for one result may comprise a title, a manufacturer, an image, a price, a category, and a size, while a supplemental content item for another result may comprise multiple images and an artist.

In some embodiments, where the search results are returned to a touch-sensitive display, each individual search results displayed on the screen may be associated with a logical region of the display; for example, a touch received in one logical region may "interact" with one result, while a touch received in another logical region may interact with a separate search result. The regions may be considered "logical" because they may be thought of as "moving" with the individual search result with which they are associated; for example, as the subset of search results "scroll" up or down the display, the logical region follows the search result until it "falls" off the display. While the absolute region of the screen that may be interacted with in order to activate a particular search result may change as the search result scrolls up or down the display, the logical region (e.g., a bounding region around the search result) continues to be associated with the search result. In this manner, each search result, as it appears on the display, is associated with at least some logical portion of the display, and as each search result scrolls off the screen, no further portion of the touch-sensitive display is associated with it. In one sense, the logical region of the display associated with a search result may be considered any part of the display which when interacted with (e.g., a mouse click, a touch, a swipe, etc.), the input is "directed to" the particular search result. As discussed herein, in various embodiments, the display may not be physically integrated with a touch-sensitive surface; however, embodiments of the present approaches may still be utilized, as may be understood by those of skill in the art.

According to various embodiments, an interaction with one of the logical regions may be detected, and the interaction "passed on" to the search result. For example, a user may press, swipe, or otherwise interact with a search result by contacting the touch-sensitive display in the logical region associated with the search result. By pressing on the display in the logical region, the search result may be "opened," which in one example results in a new page being loaded in the app that contains more details about the individual search result. According to an embodiment, a user may swipe in a horizontal direction on the logical region, where the user swipes in a vertical direction to scroll the search results, or vice versa depending on the device configuration. In response to detecting the swipe, a first supplemental content item may be generated. In various embodiments, the supplemental content item or element for some or all of the search results may be "lazy loaded" in the background once the search results are received or displayed, or the supplemental content item or element for a subset of the search results may be generated in the background. For example, if a display has three search results displayed at a time, then each search result that is displayed has the corresponding supplemental content item(s) or element(s) generated automatically in the background, prior to or during any user interaction. In other embodiments, any supplemental content item or element for a search result that is interacted with is generated "on the fly" once the interaction is determined. In embodiments where a content item may have more than one supplemental content item or element capable of being generated, then the entire set of supplemental content items or elements may be generated at once, or they may be generated individual on demand.

According to various embodiments, the supplemental content item or element for a particular search result may differ from a supplemental content item or element for another search result. As discussed herein, various criteria may be evaluated in order to determine what supplemental content associated with a particular search result is to be utilized, as well as a format for the supplemental content. For example, a search item that corresponds to an album may have a supplemental content item or element that includes one or more songs and interface elements that allow the songs to be played. A search item that corresponds to a food item may have a supplemental content item or element that includes nutritional information. A search item that corresponds to a clothing item may have a supplemental content item or element that includes multiple images or virtual displays of the clothing item, available colors, size information, etc. A search item that corresponds to a laptop may have a supplemental content item or element that includes specifications, reviews, etc. The determination regarding what information (e.g., supplemental content) associated with an item to use for one or more supplemental content items or elements may be determined based on the unique identifier, a category, a type, and/or any other data or flag that may be associated with the particular search result, as may be automatically determined based on various preferences set by a user, device manufacturer, operating system provider, app provider, etc. In various embodiments, a listing of search results may comprise different types of items, such that one search result may have a supplemental content element with specification data (e.g., textual data) such as size, capacity, etc., while a music search result right below it may have a supplemental content element with track listings that also includes interface elements that are configured to initiate playback of the particular track(s).

A supplemental content item or element may be generated based on one or more "template" supplemental content items or elements; for example, a clothing item returned as a search result may have a "clothing" template that includes a first supplemental content item or element that contains placeholders for multiple product image views, a second supplemental content item or element that contains placeholders for sizing information, a third supplemental content item or element that contains placeholders for customer reviews, and so on.

Once an interaction (e.g., a lateral swipe) with the logical region associated with the search result is detected, a visual animation is generated and displayed that in one embodiment comprises the search result "sliding" in the direction of the swipe such that the search result "slides" off the screen and its first associated supplemental content item or element sliding onto the screen in its place. In various embodiments, this animation may take various forms and may include distinguishing visual flourishes such as effects, colors, etc., and may be accompanied by audio feedback, tactile sensation feedback such as vibrations, etc.

In various embodiments, the visual animation may occur in a direction that is substantially perpendicular to the direction that the search results scroll. This allows for differentiation between gestures or other input intended for scrolling versus activation of a supplemental content element. The visual animation completes when the supplemental content element visually replaces the search result on the display. In various embodiments where additional supplemental content elements are generated for a particular search item, the same action that initiated the animation to display the first supplemental content element may be utilized to "replace" the first supplemental content element with the second supplemental content element, and so on. In some embodiments, the search result may be re-displayed; for example, once all associated supplemental content elements have been displayed in response to multiple separate interactions. In an embodiment with a search result and two supplemental content elements, this may be thought of as a continuous loop of search result>first supplemental content element>second supplemental content element>search result, etc. In an embodiment, this animation sequence may occur when it is determined that additional supplemental content elements are not capable of or indicated to be generated, while in various other embodiments, interactions with the ultimate supplemental content element results in no further animations, or in some examples, some type of feedback (e.g., tactile, audio, visual, etc.) that there are no more supplemental content elements to be displayed and the interactions when taken in reverse cycle back through the supplemental content elements and end back at the start with the search result.

According to various embodiments, search results that have been interacted with (e.g., a supplemental content element has been activated for the search result) may be visually or otherwise distinguished in the ordered set of search results, such that a user may quickly identify which search results they have interacted with. For example, a first subset of three search results are displayed on the screen. A user interacts with the second search result, which results in the displaying of a supplemental content element for that search result. The user then scrolls down in the ordered list of search results without "closing" the supplemental content element for the second search result, and the supplemental content element scrolls off the screen. Later, the user scrolls back up in the ordered list where the second search result is located, and instead of the supplemental content element being displayed, the original search result is displayed with at least a visual indicator associated with the search result. In this embodiment, the user is able to visually distinguish "viewed" search results and does not have to "close" each supplemental content element in order to be able to view the full listing of search results as they were initially displayed.

According to various embodiments, the display of various common characteristics of search results may be modified based upon a selection of one or more of the common characteristics in a supplemental content element. For example, if a set of search results comprising images of dresses of various colors is received in response to a "casual dresses" query, and a user initiates a progressive display panel for one of the search results where in a supplemental content element the user selects a "red" color for the particular search results, then a determination may be made regarding which of the full set of search results also have a "red" option, and change the display of all the dresses in the search results list to red. In addition to, or in place of color, other characteristics may be used, such as material, patterns, textures, or any visual characteristic.

By allowing a user to initiate a separate user experience relating to a single search result in an independent supplemental content element, the user does not have to "navigate" away from the search results as in previous approaches. Previous approaches can involve generating new content windows (e.g., pages) to show details about an item in a listing of search results. This can be confusing to the user and can result in a plethora of independent windows, each taking up resources (e.g., memory, video processor cycles, display screen space, etc.). Some approaches may result in the loss of a search result "state," such that a user has to repeat a search, which wastes bandwidth, processor cycles, etc. For example, a user may click on a search result, which generates a new detail page, and then click "back," only to find that the search results and/or their ordering has not been persisted, leaving the user with no choice but to re-do the search.

Accordingly, approaches in accordance with various embodiments improve the operation and performance of computing devices, such as those on which they are implemented by reducing computing resources needed to activate and maintain aspects of a GUI. Approaches in accordance with various embodiments additionally improves the relevant technologies of search, user interfaces, mobile computing, touch interfaces, and the like through specific techniques that achieve an improved technological result. By using a supplemental content element inline with search results to provide additional information about a search result, resources required to generate and maintain multiple windows can be reduced, and bandwidth and processor cycles required to go "back" to a previous search result (e.g., on a traditional web browser with a traditional UI) can be eliminated. Additionally, more accurate information may be originally displayed about an item; for example, current approaches incentivize the use of extremely long, detailed titles for items that incorporate as much supplemental information as possible. This actually reduces the value of titles to consumers because the title become unclear and too long for meaningful consumption. By automatically shortening titles when supplemental content elements are available, as in some embodiments, or merely encouraging the use of shorter titles initially, the search experience for users can be more focused and successful, leading to fewer searches and the accompanying resource utilization.

Various embodiments incorporating a "lazy loading" or background approach to generating supplemental content elements, as well as those incorporating an on-demand generation of supplemental content elements, improve loading speed of pages and of the supplemental content elements. This means that the pages and/or elements are more responsive, especially on resource-constrained devices, and not having to load product detail pages that may contain numerous resources and/or supplemental content not directly associated with the product (e.g., "related items," "suggested items," etc.) similarly improves loading and interaction performance.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

FIG. 1 illustrates an example user interface 100 that can display search results, in accordance with various embodiments. Although a portable computing device 102 (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In the example 100 of FIG. 1, a user has entered a search query on a computing device 102 and received a list of search results 104 in response. The search results 104 are displayed in a content window on the computing device 102, such as an "app," browser window, etc. For example, a user may have entered a search query directed to an electronic marketplace that offers items for sale. The content window may be any window utilized in the GUI that can display the search results; for example, the electronic marketplace may have an application executing on the electronic device 102 that has its own UI, or a web browser application having its own UI may be used, among various embodiments.

In the example 100 of FIG. 1, the user has entered a search query for "laptop computers" at an electronic marketplace, and in response, a listing of individual items 106-112 matching the search query may be returned and displayed in the content window 104. According to an embodiment, the search results may include too many items to display in a single content window 104, so various techniques may be used to allow the user to maneuver through the entire search result set. For example, the individual items 106, 110, 114 illustrated in FIG. 1, along with descriptive content 108, 110 may be a subset of the entire search result set, and may be displayed on an individual "page" of the content window (e.g., the search results of FIG. 1 may be "page X of Y," where X is the current page and Y is the total number of pages that would be required to display all of the search results. In other embodiments, the content window may scroll up or down to display the entire search result set, some number of items at a time; e.g., however many can fit on the content window at a time. In some embodiments, the search results 104 may include at least a portion of additional information. For example, the displayed search results 106, 110, 114 comprise laptop computers, so a picture of the laptop is presented to the user along with some measure of additional information 108, 112, such as a brand, price, availability, rating, etc.

FIGS. 2A-2D illustrate an example user interface that can display progressive information panels, in accordance with various embodiments. While the examples of FIGS. 2A-2D illustrate a mobile device 102 with a touch-sensitive surface (i.e., the display screen) and the user utilizing touch gestures with a finger 202 touching the display, in various embodiments a user may select search results in various ways that do not involve touching a display, such as on a touch-sensitive trackpad or similar device. It should be understood that reference numbers may be carried over between figures for similar components for purposes of explanation, but that such use should not be interpreted as a limitation on the various embodiments.

Figure 2A:
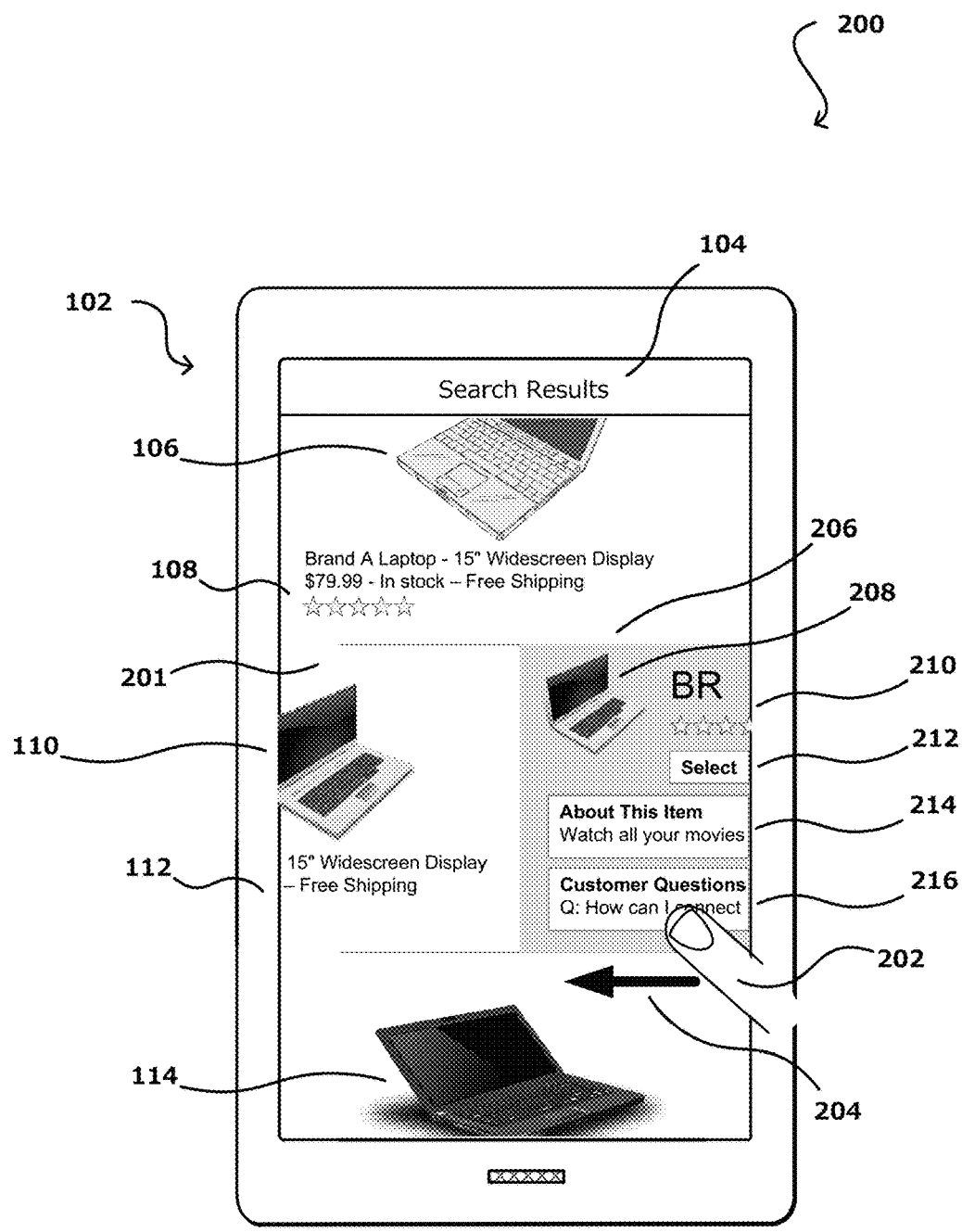
FIGS. 2A-2D illustrate an example user interface that can display progressive information panels, in accordance with various embodiments.

In the example of FIG. 2A, a user 202 has initiated a touch gesture sliding in a horizontal direction 204, the gesture 204 directed to a logical region 201 of the display that is associated with a search result 110. In response to the gesture 204, a supplemental content element 206 begins to slide in from the right side of the screen in an animated fashion, where the supplemental content element 206 visually "replaces" the search result 106 within the logical region 201. In the example of FIG. 2A, the supplemental content element 206 contains supplemental information such as an image 208 of the product, descriptive information 210 such as a title, price, rating, etc., an interface element 212 allowing for selection of an option, attribute, or characteristic associated with the product, and other supplemental information such as a description 214, customer questions/reviews 216, etc.

Figure 2B:
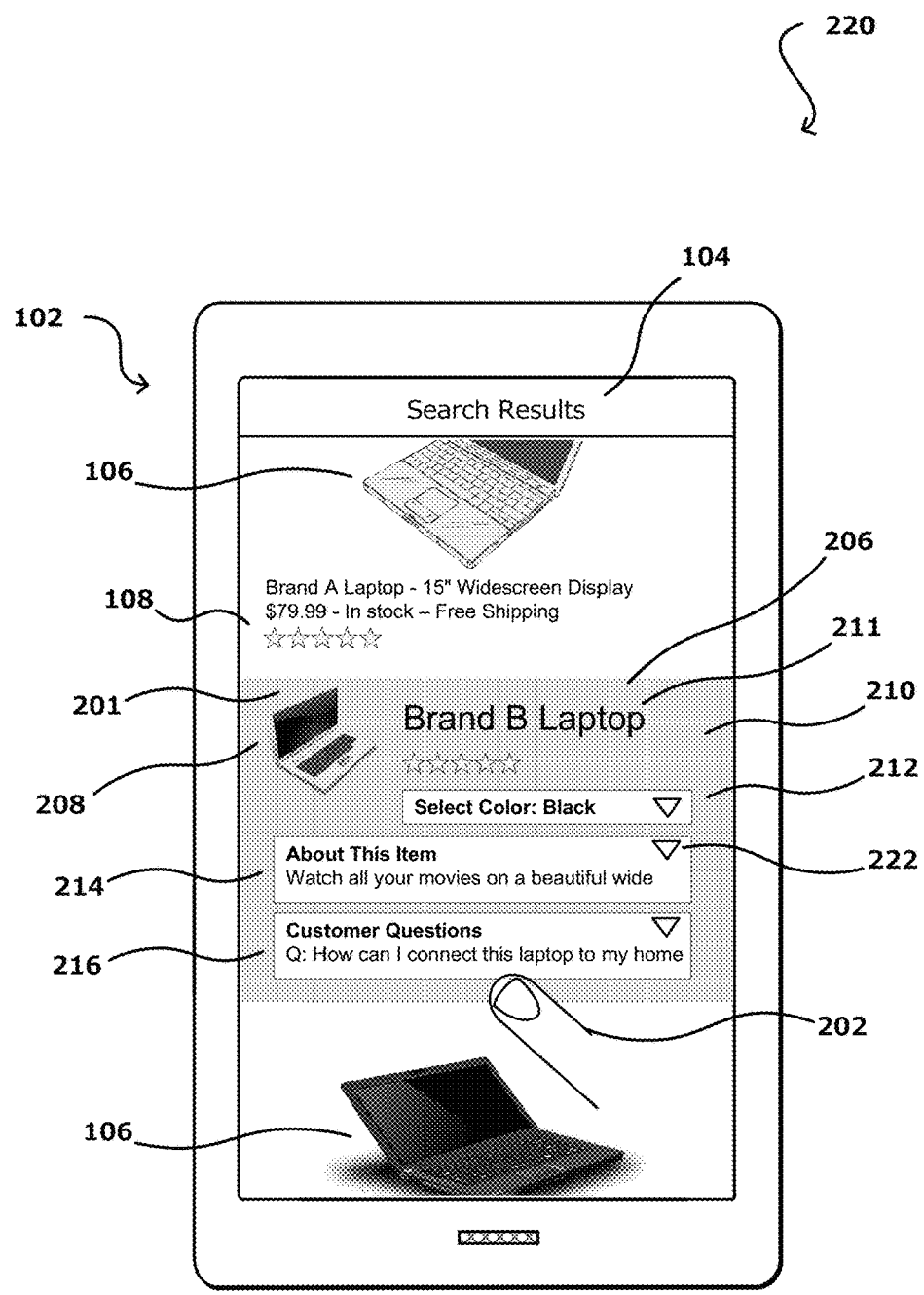
Figure 2C:
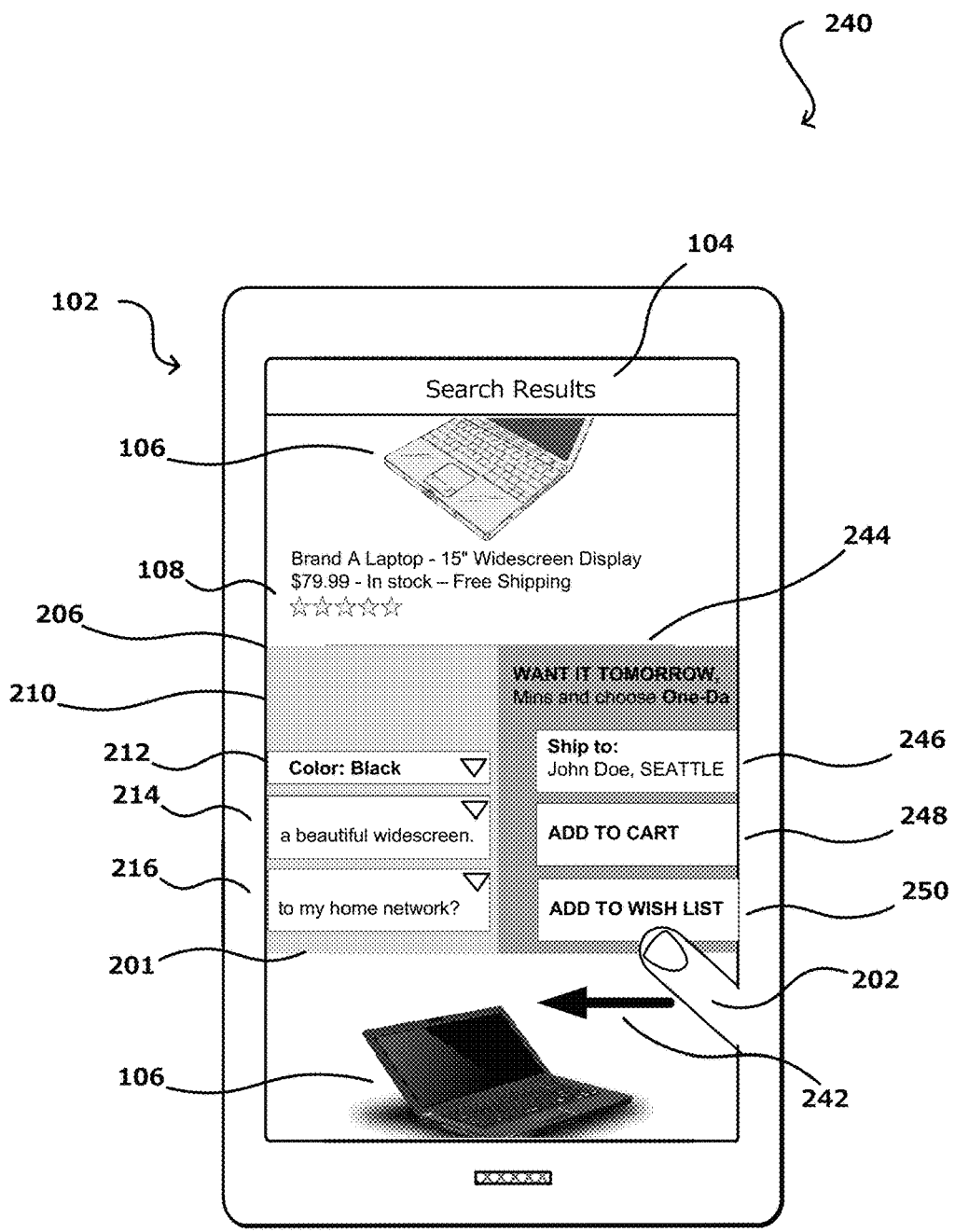

In the example 220 of FIG. 2B, the animation is completed and the supplemental content element 206 has replaced the search result 110 in the logical region 201. According to various embodiments, certain information such as a title 211 may be modified from a "standard" display of search results such as that illustrated in FIG. 2A. For example, certain information may be pulled from a title and re-populated in part or in full into separate supplemental content elements. In the example of FIG. 2B, a long title that contains multiple portions of data about an item is replaced with a shorter title only containing a subset of the original title, and at least some of the data previously displayed in a title (or other portion of the search result) is removed dynamically and used in populating other supplemental content elements, such as specifications, shipping data, etc. Some data may be considered and/or marked as "essential," such that portions of the data displayed in the search results may be reduced to the essential data (e.g., brand and type of item) in a title listing provided in a supplemental content elements.

According to various embodiments, a user may "swipe" back to the right (in the opposite direction of the first swipe) to return to the first view, or swipe to the left to expose a second supplemental content item. In the example 240 of FIG. 2C, the user has initiated a second gesture 242 in the same direction as the first, the gesture being associated with the supplemental content element 206. Similarly to the example of FIG. 2A, a second supplemental content element 244, with different supplemental content 246-250 slides over in an animated fashion to replace the first supplemental content element 206.

Figure 2D:
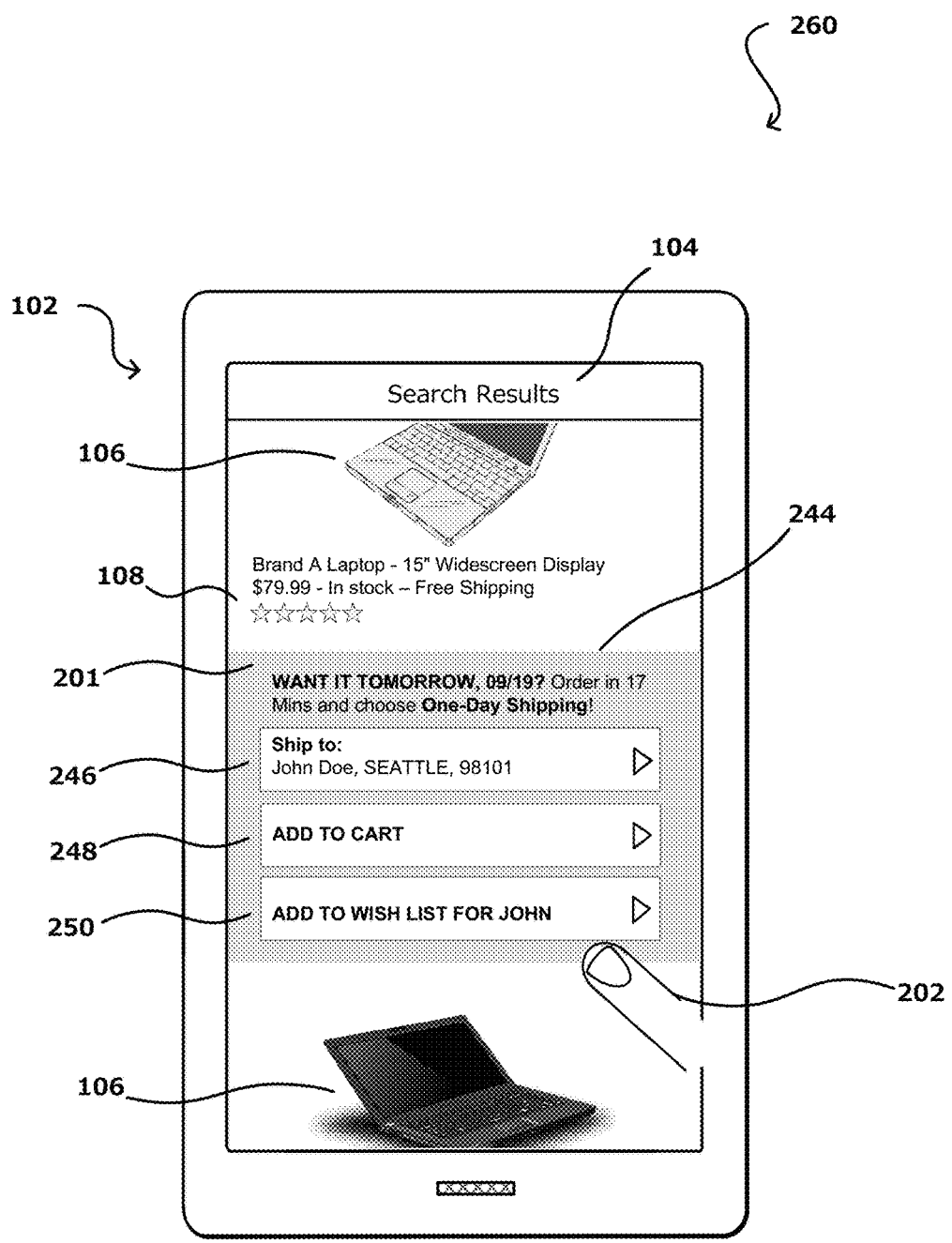

In the example 260 of FIG. 2D, the animation is completed and the second supplemental content element 244 has replaced the first supplemental content element 206 in the logical region 201. The second supplemental content element 244 may contain various supplemental content such as interface elements associated with shipment options 246 and purchasing options such as adding an item to a shopping cart 248 or wish list 250, while other options may offer different types of purchasing actions.

According to various embodiments, as discussed earlier, a user may utilize a touch-sensitive surface to perform the gestures 204, 242 (e.g., the display, a touchpad, etc.), although in various embodiments other interactions with a surface may be utilized such as a pressure-dependent and/or touch duration approach. For example, once the user has maintained a touch with the surface for at least a threshold amount of time and/or applied a threshold amount of pressure to the touch-sensitive surface, the supplemental content element 206 may be generated and displayed as in the examples of FIGS. 2A-2D.

Various embodiments allow a user to dismiss the supplemental content element 206 without completing a purchase or taking other action, and thereby return control to the search results 104 that are left as they were (i.e., in the same state) prior to activating the supplemental content element 206, such as by swiping in the opposite direction until the search result 110 is re-displayed, or an interface element or action (e.g., a gesture) may be utilized to immediately return to the search result 110 regardless of whether the first supplemental content element 206 is displayed, the second supplemental content element 244, etc.

Figure 3A:
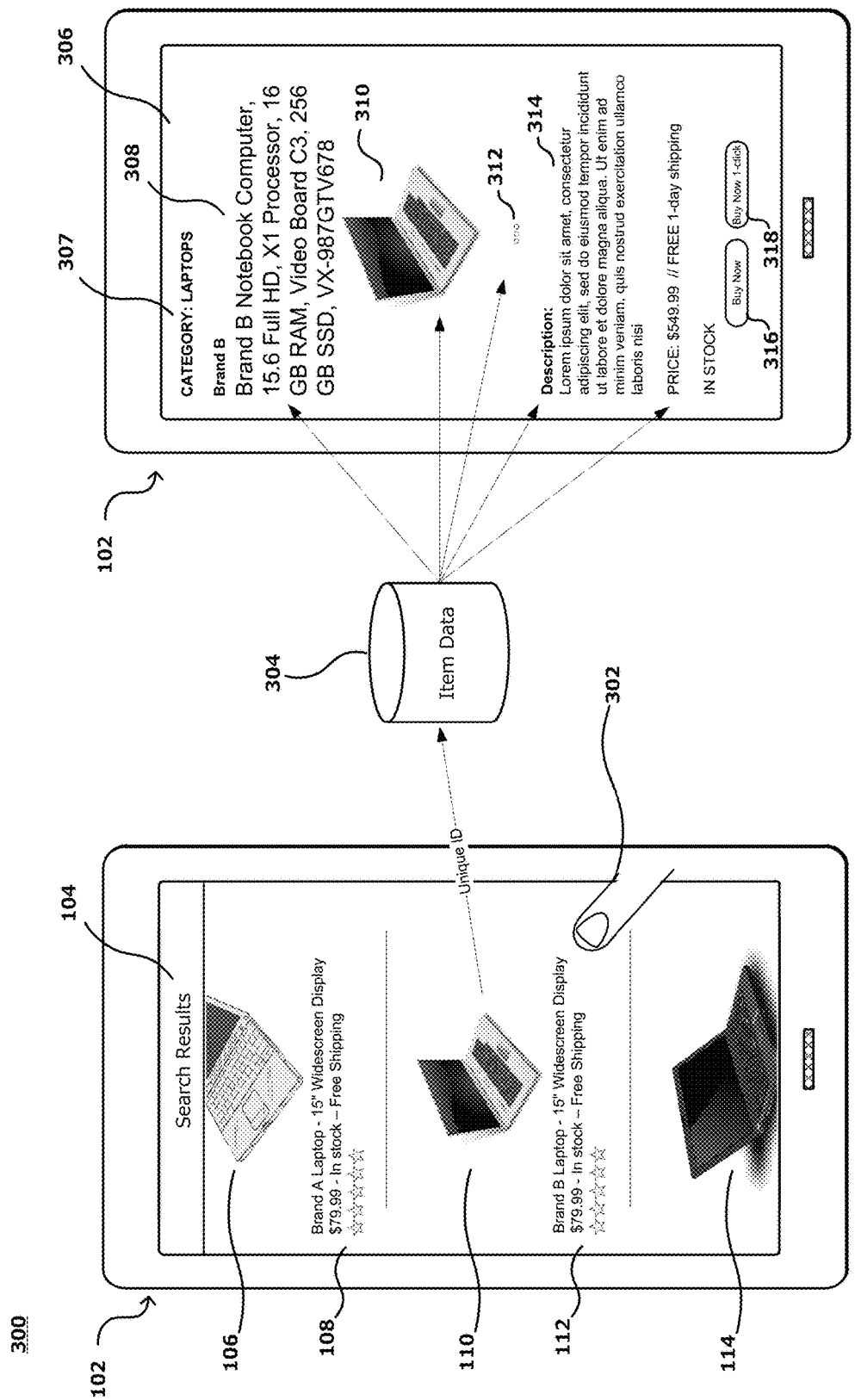
FIGS. 3A-3B illustrate an example system to generate an item detail page, in accordance with various embodiments.

FIG. 3A illustrates an example system 300 to generate an item detail page, in accordance with various embodiments. In the example of FIG. 3A, a particular search result 110 is selected by a user 302, and an item detail page 306 may be generated as a result and displayed in place of the search results page 104. According to an embodiment, the search result 110 is associated with a unique identifier, which is presented to a data store 304 that contains data about the selected item 110 (e.g., brand, manufacturer, specifications, price, shipping data, inventory, etc.), and this data is used to generate the item detail page 306. For example, data comprising an item category 307 may be pulled from the data store 304 along with a title 308, a primary image 310 that may have alternate images available as well, which may be indicated by an interface element 312. A description 314 may be displayed that includes price data and shipping availability, and interface elements 316-318 may be presented which when activated, cause a purchasing action to be initiated such as buying an item immediately, putting an item in a shopping cart or on a wish list, etc.

Figure 3B:
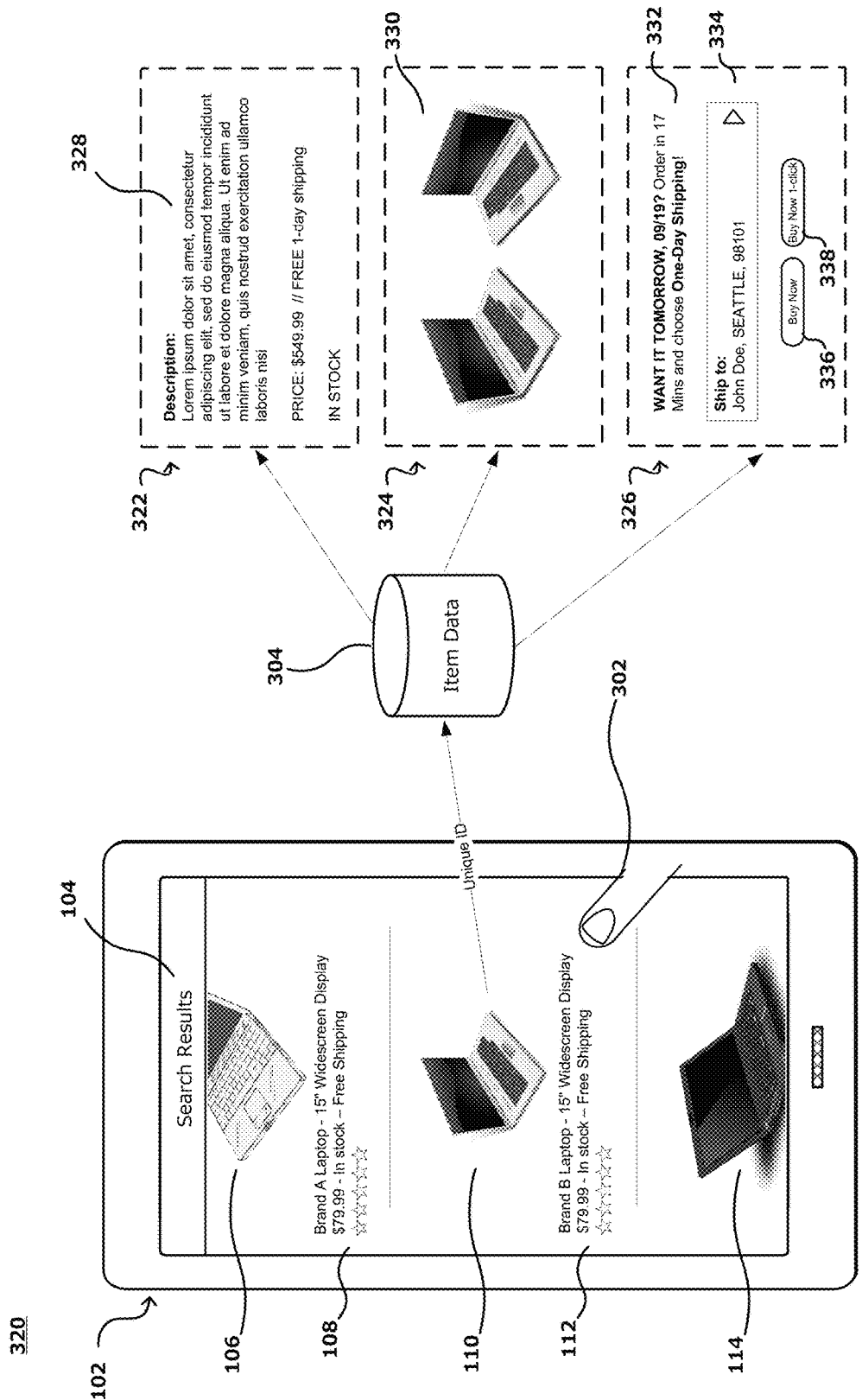

FIG. 3B illustrates an example system 320 to generate multiple supplemental content elements, in accordance with various embodiments. In the example of FIG. 3B, a particular search result 110 is interacted with by a user 302, for example as discussed with reference to FIGS. 2A-2D, and various supplemental content elements 322-326 may be generated dynamically as a result of the interaction. The supplemental content elements 322-326 may be generated all at once (e.g., using a "lazy loading" approach, or dynamically upon individual interaction. According to an embodiment, each of the supplemental content elements 322-326 draw data from the data store 304, for example based upon a unique identifier associated with the particular search result 110. One supplemental content element 322 in the example of FIG. 3B may include a description 328 of the selected search result, such that some of the data may include text that previously appeared in a long title associated with the particular search result 112. Another supplemental content element 324 may include one or more images 330 of the particular item, for example arranged in a grid or available upon initiating various interactions with the supplemental content element 324, such as swiping in a different direction that that which changes the display of the supplemental content elements 322-326, or a pressure-sensitive touch, a duration touch, etc. Another supplemental content element 326 may contain shipping information 332 as well as interactive elements 334 such as may allow a user to indicate a shipping address, a billing address, etc. Interactive interface elements 336-338 may also be provided to initiate a purchasing action.

Figure 4:
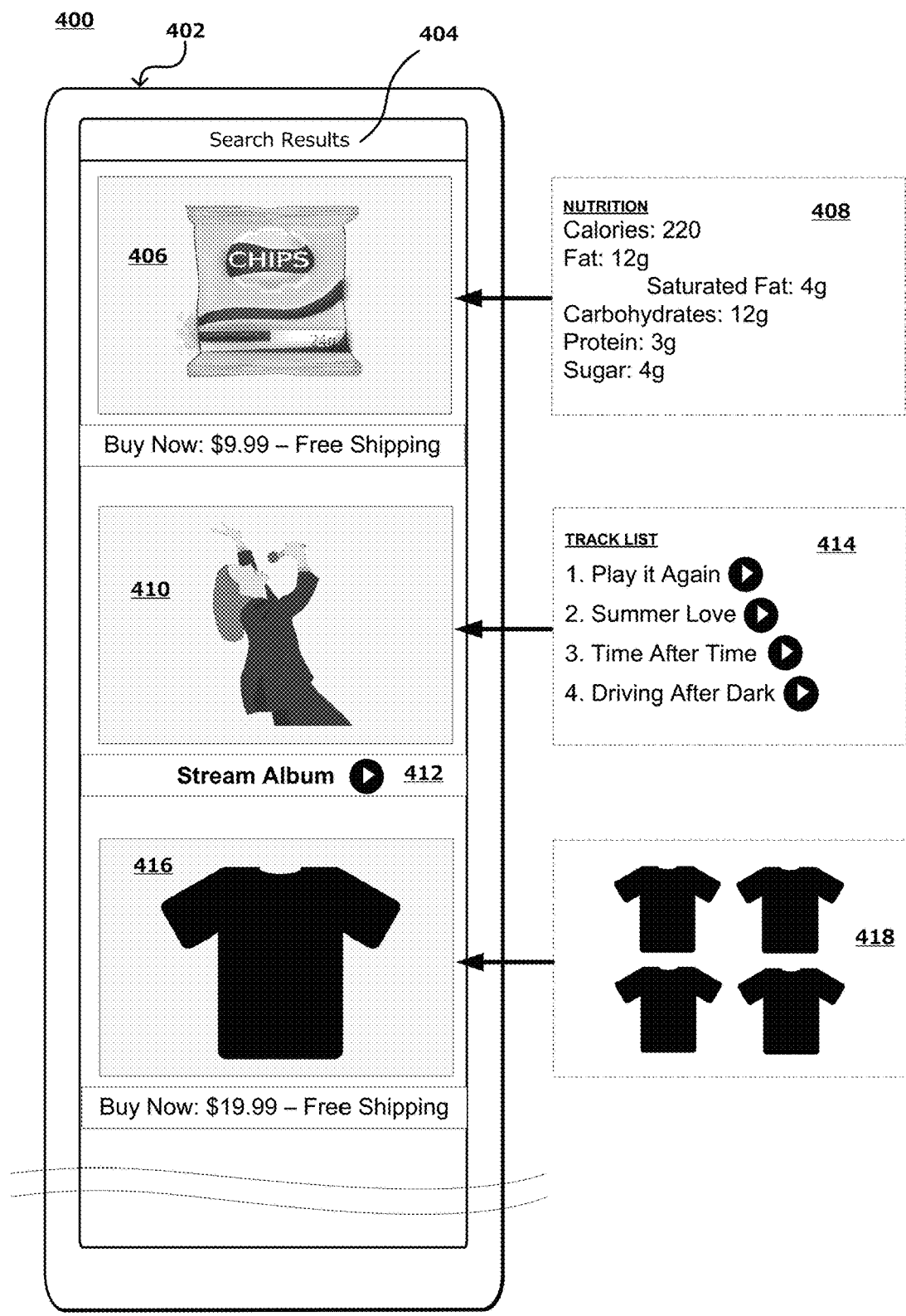
FIG. 4 illustrates an example user interface that can display progressive information panels, in accordance with various embodiments.

In an example embodiment such as that of FIG. 3B, once a search result 110 is activated, the data store 304 is queried with a unique identifier, and the available data is broken down into various portions that can be utilized in supplemental content elements 322-326. For certain unique identifiers, categories, etc. of items, the information may be utilized in different ways in different styles of supplemental content elements. For example, a "music" category, or an item with a particular unique identifier, may be associated with a template supplemental content element that includes places where track listings may be "inserted" in order to generate the supplemental content element. For other categories such as apparel, a template supplemental content element may have placeholders for images of the item. In various embodiments, some data items may be indicated as "essential," such that they should be presented on the first supplemental content element or utilized in various ways in order for the essential data to be preserved throughout the supplemental content element presentation or featured in various ways. FIG. 4 illustrates an example user interface 400 that can display progressive information panels, in accordance with various embodiments. In the example 400 of FIG. 4, a listing of search results 404 is displayed on a computing device 402 with a touch-sensitive display. A subset of the search results 404 is displayed 406, 410, 416, with an example of different supplemental content elements 408, 414, 418 that are generated and displayed upon interaction with a corresponding search result 406, 410, 416, as discussed herein and with reference to FIGS. 2A-2D. In the example of FIG. 4, the first search result 406 of the subset of search results is a food item (i.e., chips). This food item may correspond to a "type" or category, which may be discovered based on an evaluation of a unique identifier associated with the search result 406, and as a result of a category or type identification, a particular supplemental content element 408 is generated, in some embodiments based on a template (e.g., "food item template"). This supplemental content element 408 contains a subset of available supplemental content for the search result 406. For example, the search result 406 may be associated with a great deal of supplemental information such as images, weight, price, reviews, etc.; however, because the search result 406 is a food item, the first supplemental content element 408 to be displayed is directed to nutritional information.

Similarly, the second search result 410 corresponds to a type or category of "music," and includes an interface element 412 configured to initiate playback or streaming of the specific music item (e.g., album). The first supplemental content element 414 for a "music" type may be configured to list individual tracks for the music item, along with interface elements configured to initiate playback of the particular track.

In the example embodiment of FIG. 4, the third search result 416 comprises an "apparel" type, and the first supplemental content element 418 associated with that type includes a gallery of several different images of the particular apparel item; for example, from different angles, with different models, in different colors, etc.

According to various embodiments, certain categories of items may have a template that includes displays of various augmented and/or virtual reality portions. For example, a user may have performed a search for furniture, and may wish to see how a particular chair or couch may "fit" into their home environment. According to an embodiment, a user may upload image data that includes their home environment, and one of the supplemental content elements may include a feature that allows for a selected search result to be "viewed" as if it were placed in the home environment. One way of performing this is by utilizing augmented reality techniques, such that a new image is generated that combines the image data of a person's home environment and image data of the selected search result, such that the selected search result appears to be placed in the image data. This may be viewed on a website, or may be viewed using augmented reality hardware such as goggles, etc.

Figure 5C:
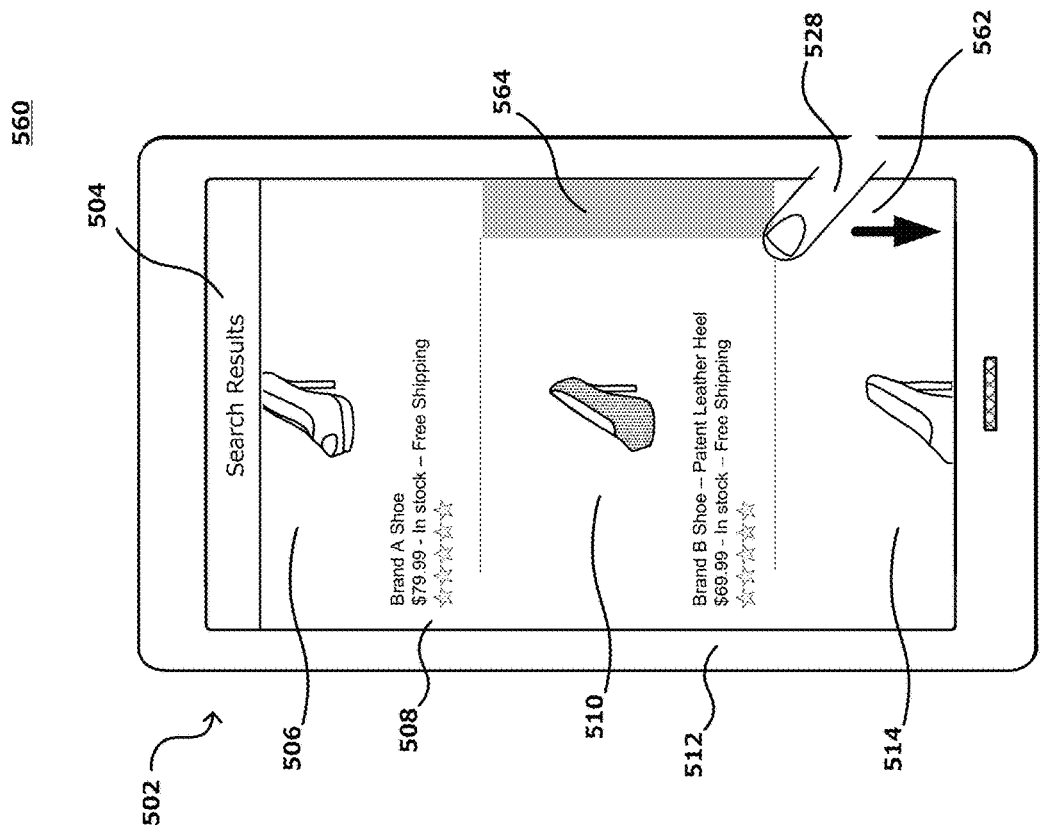

FIGS. 5A-5C illustrate an example user interface that can display search results and progressive information panels, in accordance with various embodiments. In the example 500 of FIG. 5A, a set of search result 504 is displayed on a computing device 502, for example with a touch-sensitive display. Three search results 506, 510, 514 are displayed along with corresponding descriptive text 508, 512 for the first two search results. A user 528 initiates a gesture 530 in a first direction associated with the second search result 510, resulting in an animation of the corresponding supplemental content element 516 sliding over in the direction of the gesture 530. The supplemental content element 516 may contain various information such as images 518, titles 520, optional selection elements 522, descriptions 524, and reviews/questions 526.

In the example of FIG. 5B, the user 528 has scrolled further into the search results 504, such as by initiating a gesture 550 is a direction substantially perpendicular to the direction 530 from FIG. 5A. As a result, a different subset of search results 541, 544, 548 and their corresponding text 542, 546 have been displayed. In the example 560 of FIG. 5C, the user 528 has scrolled back to the original position in the search results 504, as in FIG. 5A, by initiating a gesture in the opposite direction 562 from FIG. 5B. Previously, the user had caused the supplemental content element 516 for search result 510 to be displayed prior to scrolling down and had not "closed" it. However, in the example 560 of FIG. 5C, the supplemental content element 516 automatically "closed" (i.e., the view was reset to the search result 510) once the supplemental content element 516 scrolled off the screen, and a visual indicator 564 is associated with the search result 510 in order to alert the user 528 which search results were previously interacted with.

Figure 6:
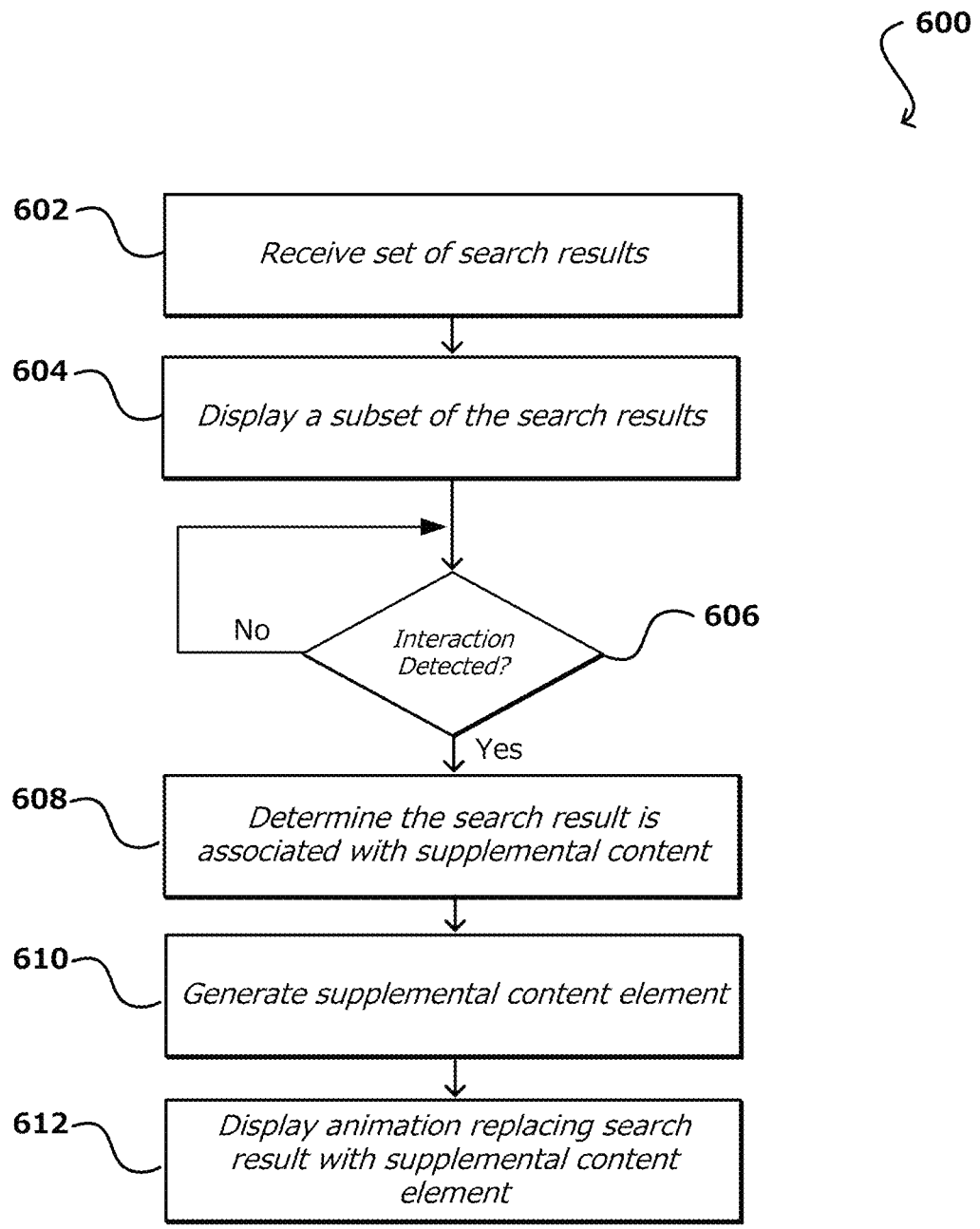
FIG. 6 illustrates an example process for displaying progressive information panels, in accordance with various embodiments.

FIG. 6 illustrates an example process 600 for displaying progressive information panels, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In the example 600 of FIG. 6, a set of search results is retrieved 602, for example in response to a query at an electronic marketplace. A subset of the search results is displayed 604, for example on a touch-sensitive display, and an check is made 606 whether an interaction (e.g., a gesture, a swipe, a pressure-specific touch, a touch duration-specific interaction, etc. The contact with the touch-sensitive surface may be determined to have particular characteristics. For example, the touch may be a gesture, may exceed a threshold pressure and/or may be held for a duration exceeding a threshold duration. As a result, it is determined 608 that the search result is associated with supplemental content and a supplemental content element is generated 610. According to an embodiment, the supplemental content element is displayed 612 using an animation (e.g., sliding) such that the supplemental content element visually replaces the search result.

Figure 7:
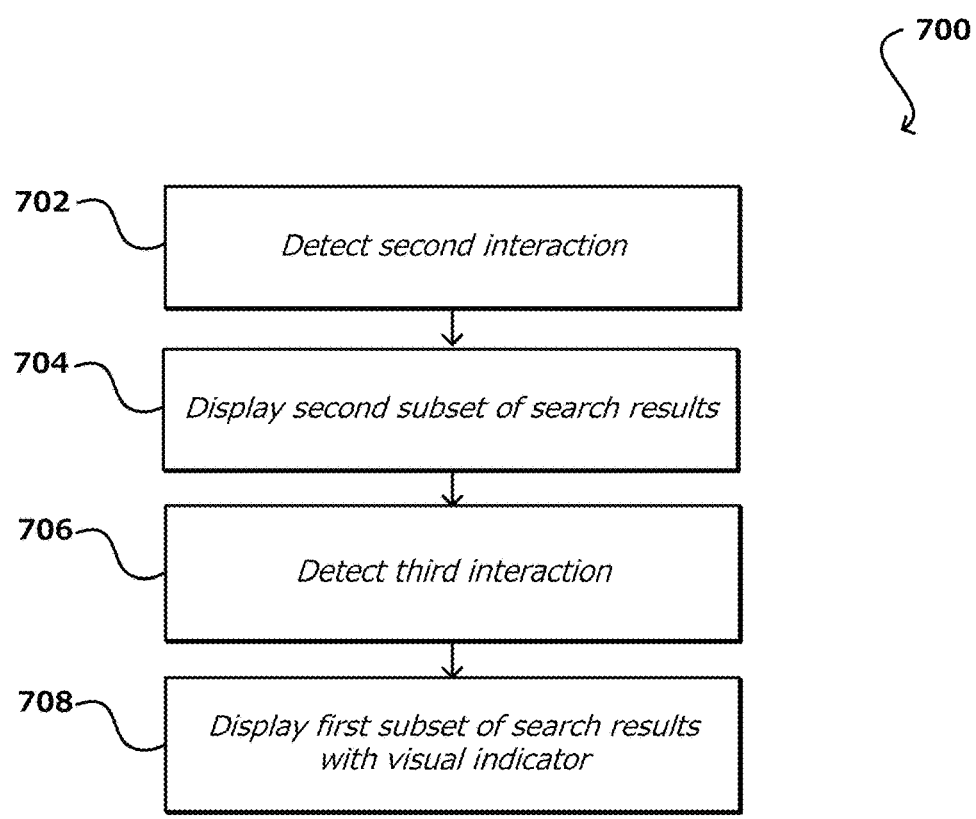
FIG. 7 illustrates an example process for displaying progressive information panels, in accordance with various embodiments.

FIG. 7 illustrates an example process 700 for displaying progressive information panels, in accordance with various embodiments. In the example 700 of FIG. 7, a second interaction with the touch-sensitive surface is detected 702; for example, a swipe downward to scroll through the set of search results such that a second subset of search results is displayed 704 that are different from the first subset. A third interaction is detected 706; for example, a user swiping upward to return the displayed search results to the first subset, whereby the first subset of search results is displayed with a visual indicator 708 being associated with one or more search results that have been interacted with in one of the manners described herein.

Figure 8:
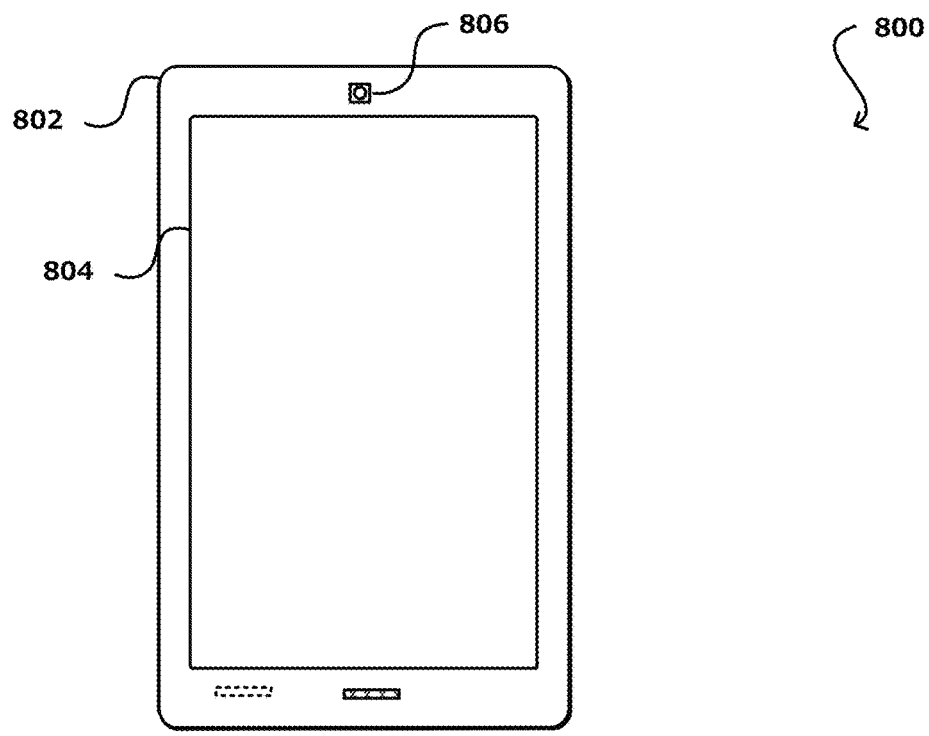
FIG. 8 illustrates an example device that can be used to implement aspects of the various embodiments.

FIG. 8 illustrates an example 700 of an electronic user device 702 (e.g., device 104 in FIG. 1A) that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 702 has a display screen 704 on the front side, which under normal operation will display information to a user facing the display screen (e.g., on the same side of the computing device as the display screen). The computing device in this example includes at least one camera 706 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 702 also includes at least one microphone 708 or other audio capture device capable of capturing audio data, such as words or commands spoken by a user of the device. In this example, a microphone 706 is placed on the same side of the device as the display screen 704, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 702 also includes at least one orientation sensor, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

The example computing device 702 may include at least one touch-sensitive surface, for example coupled to the display screen 704, or the display screen 704 may be a touch-sensitive surface. The example computing device 702 may also include at least one component for detecting touch to the at least one touch-sensitive surface, including at least duration and/or pressure of such touches, as well as at least one component for detecting gestures, for example made by touching the touch-sensitive surface with a finger and moving the finger in a pattern while maintaining contact with the touch-sensitive surface.

FIG. 8 illustrates a logical arrangement of a set of general components of an example computing device 800 such as the device 702 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. The device in many embodiments will include at least one gesture detection element 808, which may include elements to detect touch on a touch-sensitive surface, as well as deciphering the use of touch patterns (e.g., tracing of a finger, number of touches, duration and/or pressure of touch, etc.) that can be determined by the processor and/or the at least one gesture detection element 808. The device in many embodiments will include at least one image capture element (not pictured) such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements 810, such as a Wi-Fi, Bluetooth, RF, wired, or wireless communication system. The device in many embodiments can communicate with a network, such as the Internet, and may be able to communicate with other such devices. In some embodiments the device can include at least one additional input component 812 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor or component (not shown). As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

Figure 9:
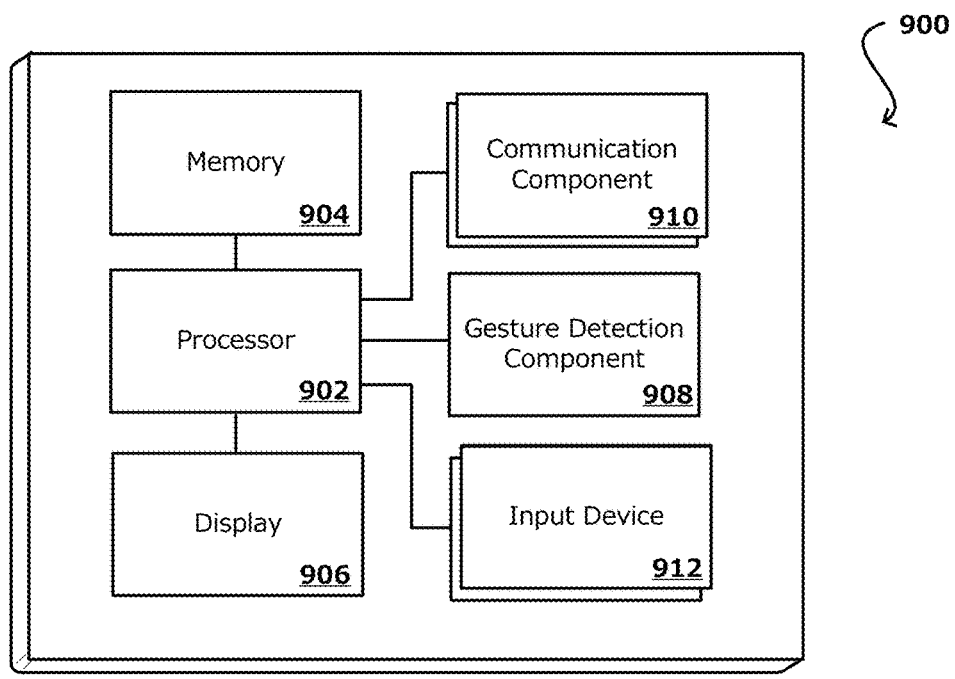
FIG. 9 illustrates an example set of basic components of a computing device, such as the device described with respect to FIG. 8.
Figure 10:
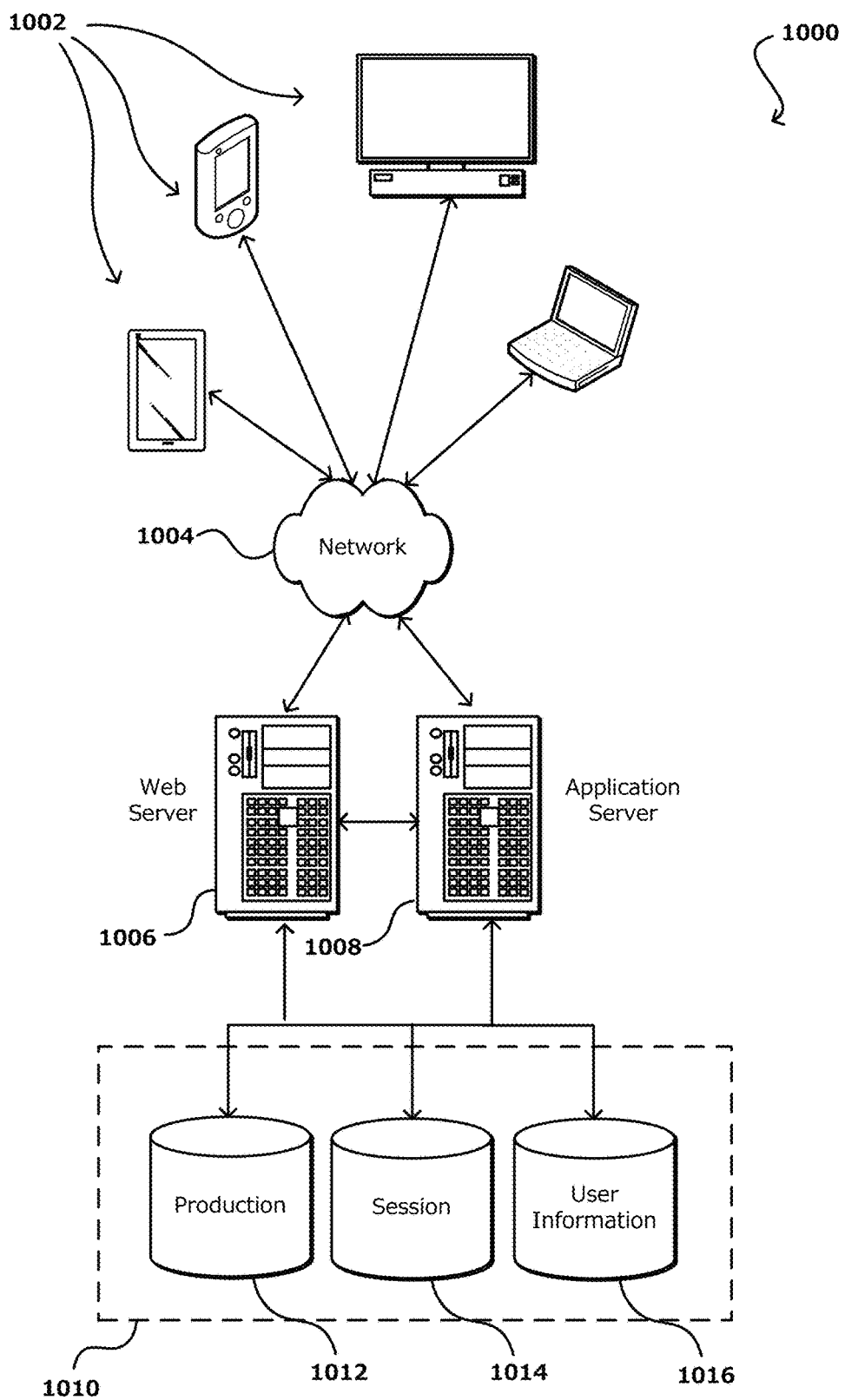
FIG. 10 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a touch-sensitive display; and
   memory including instructions that, when executed by the at least one processor, cause the computing device to:
   receive, at the computing device, a set of search results executed against a data source, the set of search results in a particular order and responsive to a search query initiated by a user of the computing device, wherein each of the search results are associated with a unique identifier;
   display a first subset of the search results on the display in accordance with the particular order, wherein each of the first subset of the search results is associated with a separate logical region of the display and the first subset of search results are configured to scroll simultaneously in a first direction while maintaining the particular order;
   detect, on the touch-sensitive display, a first interaction with a first logical region of the display associated with a first search result of the first subset of search results, the first interaction in a second direction; and
   in response to detecting the first interaction with the first logical region:
   generate a first supplemental content item associated with the first search result; and
   display a first visual animation of the first search result sliding in the first logical region in the second direction, differing from the first direction, simultaneously with the first supplemental content item sliding in the first logical region in the second direction,
   wherein the first supplemental content item visually replaces the first search result in the first logical region of the display while maintaining the particular order;
   detect, on the touch-sensitive display, a second interaction with the first logical region of the display, the second interaction being in the second direction; and
   in response to detecting the second interaction:
   determine, based at least on the unique identifier, that a second supplemental content item associated with the first search result is not to be generated;
   display a second visual animation of the first supplemental content item sliding in the first logical region in the second direction simultaneously with the first search result sliding in the first logical region in the second direction,
   wherein the first search result visually replaces the first supplemental content item in the first logical region of the display while maintaining the particular order.

2. The computing device of claim 1, wherein the instructions when executed further cause the computing device to:
   detect, on the touch-sensitive display, a second interaction with the touch-sensitive display, the second interaction being along the first direction;
   display, in response to detecting the second interaction, a second subset of the search results on the display in accordance with the particular order, wherein the second subset of the search results are different from the first subset;
   detect, on the touch-sensitive display, a third interaction with the touch-sensitive display, the third interaction being in the opposite direction of the second interaction; and
   display, in response to detecting the third interaction, the first subset of the search results on the display in accordance with the particular order,
   wherein the first supplemental content item has been visually replaced by the first search result in the first logical region of the display without an additional interaction being received in the first logical region of the display, and
   wherein a visual indicator is displayed in the first logical region of the display associated with the first search result.

3. The computing device of claim 1, wherein the first supplemental content item comprises specification data about the first search result, and the instructions when executed further cause the computing device to:
   detect, on the touch-sensitive display, a second interaction with a second logical region of the display associated with a second search result of the first subset of search results; and
   generate, in response to detecting the second interaction with the second logical region, a second supplemental content item associated with the second search result, wherein the second supplemental content item is generated based at least on the unique identifier associated with the second search result and contains an interface element configured to initiate access to an audio and/or visual content item.

4. A computer-implemented method, comprising:
   at an electronic device having a touch-sensitive display, receiving, at the electronic device, a set of search results as a result of executing a query against a data source, wherein each of the search results is associated with a unique identifier;

displaying, on the touch-sensitive display, a first subset of the set of search results, wherein each of the first subset of search results is associated with a logical region of the display and wherein the first subset of the set of search results has a first direction for navigation thereof;

detecting, on the touch-sensitive display, a first interaction with a first logical region of the display, the first logical region of the display being associated with a first search result of the first subset;

determining, based at least on the unique identifier associated with the first search result, that the first search result is associated with first supplemental content;

generating a first supplemental content element containing at least a subset of the first supplemental content;

displaying, in response to the first interaction, a first visual animation comprising the first search result appearing to slide in a second direction simultaneously with the first supplemental content element appearing to slide in the second direction onto the display, the second direction differing from the first direction, wherein the first supplemental content element visually replaces the first search result in the first logical region of the display;

detecting, on the touch-sensitive display, a second interaction with the first logical region of the display;

determining, based at least on the unique identifier associated with the first search result, that the first search result is associated with additional supplemental content;

generating, in response to the second interaction, a second supplemental content element containing at least a subset of the additional supplemental content; and displaying, in response to the second interaction, a second visual animation comprising the first supplemental content element appearing to slide in the second direction simultaneously with the second supplemental content element appearing to slide in the second direction onto the display, wherein the second supplemental content element visually replaces the first supplemental content element in the first logical region of the display.

5. The method of claim 4, wherein the second supplemental content element includes an interface element configured to initiate a purchasing action at an electronic marketplace.

6. The method of claim 4, further comprising:
determining that the first search result corresponds to a first category, based at least on the unique identifier associated with the first search result; and
selecting the subset of the first supplemental content based at least on the first category.

7. The method of claim 6, further comprising:
determining a first supplemental content element template based at least on the first category,
wherein the first supplemental content element is generated based at least on the first supplemental content element template.

8. The method of claim 6, wherein the subset of the first supplemental content comprises at least one of: nutritional information, apparel sizing information, a plurality of images associated with the first search result, one or more playable content items associated with the first search result, augmented reality visualizations, or product specifications associated with the first search result.

9. The method of claim 4, wherein the first search result is associated with a first title to be displayed on the display along with the first search result, and further comprising:
modifying, prior to displaying the first subset of the set of search results, the first title based at least on a determination that the first supplemental content element is capable of being generated.

10. The method of claim 4, wherein the first supplemental content element is generated in response to one of displaying the first search result or detecting the first interaction.

11. The method of claim 4, further comprising:
detecting, on the touch-sensitive display, a second interaction in the second direction;
displaying, in response to the second interaction, a second subset of the set of search results, wherein the second subset of search results are different from the first subset;
detecting, on the touch-sensitive display, a third interaction in a third direction substantially opposite from the second direction; and
displaying, in response to the third interaction, the first subset of the set of search results,
wherein the first supplemental content element has been visually replaced by the first search result in the first logical region of the display, and
wherein a visual indicator is displayed in the first logical region of the display associated with the first search result.

12. The method of claim 4, wherein the first subset of the set of search results further comprises a second search result and a third search result, the second search result and the third search result being displayed simultaneously with the first search result, and further comprising:
displaying a set of visual characteristics in the first supplemental content element, the set of visual characteristics being associated with the first search result;
receiving a selection of one of the visual characteristics;
determining that the selected visual characteristic is associated with at least one of the second search result or the third search result; and
modifying the display of the at least one of the second search result or the third search result based on the selected visual characteristic.

13. A non-transitory computer-readable storage medium including instructions that, when executed by at least one processor of a computing system, cause the at least one processor to:
receive, at an electronic device, a set of search results as a result of executing a query against a data source, wherein each of the search results is associated with a unique identifier;
display a first subset of the set of search results, wherein each of the first subset of search results is associated with a logical region of a display and wherein the first subset of the set of search results has a first direction for navigation thereof;
detect a first interaction with a first search result of the first subset;
determine, based at least on the unique identifier associated with the first search result, that the first search result is associated with first supplemental content;
generate a first supplemental content element containing at least a subset of the first supplemental content;
display, in response to the first interaction, a first visual animation comprising the first search result appearing to slide in a second direction simultaneously with the first supplemental content element appearing to slide in the second direction onto the display, the second direction differing from the first direction,
wherein the first supplemental content element visually replaces the first search result on the display;
detect a second interaction with the first supplemental content element;
determine, based at least on the unique identifier associated with the first search result, that the first search result is associated with additional supplemental content;
generate, in response to the second interaction, a second supplemental content element containing at least a subset of the additional supplemental content; and
display, in response to the second interaction, a second visual animation comprising the first supplemental content element appearing to slide in the second direction simultaneously with the second supplemental content element appearing to slide in the second direction onto the display,
wherein the second supplemental content element visually replaces the first supplemental content element on the display.

14. The non-transitory computer-readable storage medium of claim 13, wherein the instructions when executed further cause the at least one processor to:
detect a second interaction;
display, in response to the second interaction, a second subset of the set of search results, wherein the second subset of search results are different from the first subset;
detect a third interaction; and
display, in response to the third interaction, the first subset of the set of search results,
wherein the first supplemental content element has been visually replaced by the first search result on the display, and
wherein a visual indicator is displayed on the display associated with the first search result.

15. The non-transitory computer-readable storage medium of claim 13, wherein the instructions when executed further cause the at least one processor to:
determine that the first search result corresponds to a first category, based at least on the unique identifier associated with the first search result; and
select the subset of the first supplemental content based at least on the first category.

16. The non-transitory computer-readable storage medium of claim 15, wherein the instructions when executed further cause the at least one processor to:
determine a first supplemental content element template based at least on the first category,
wherein the first supplemental content element is generated based at least on the first supplemental content element template.

17. The non-transitory computer-readable storage medium of claim 13, wherein the first interaction comprises at least one of touch input, touch pressure detection, touch duration detection, voice input, input associated with gaze detection, or input with a pointing device communicably connected to the electronic device.

* * * * *